United States Patent
Choi et al.

(10) Patent No.: US 11,240,680 B2
(45) Date of Patent: Feb. 1, 2022

(54) DEVICE AND METHOD FOR ANALYZING PROPAGATION CHARACTERISTICS IN WIRELESS COMMUNICATION SYSTEM

(71) Applicant: Samsung Electronics Co., Ltd., Gyeonggi-do (KR)

(72) Inventors: Dongkyu Choi, Gyeonggi-do (KR); Junghwan Choi, Gyeonggi-do (KR); Jaesung An, Gyeonggi-do (KR); Sungrok Yoon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/738,767

(22) Filed: Jan. 9, 2020

(65) Prior Publication Data

US 2020/0221316 A1 Jul. 9, 2020

(30) Foreign Application Priority Data

Jan. 9, 2019 (KR) ........................ 10-2019-0002697

(51) Int. Cl.
*H04W 4/00* (2018.01)
*H04W 16/26* (2009.01)
*H04W 16/18* (2009.01)

(52) U.S. Cl.
CPC .......... *H04W 16/26* (2013.01); *H04W 16/18* (2013.01)

(58) Field of Classification Search
USPC ................ 342/174, 368; 370/344; 455/67.11
See application file for complete search history.

(56) References Cited

U.S. PATENT DOCUMENTS

| 5,970,061 A * | 10/1999 | Kokudo ................. H04B 7/082 370/344 |
| 8,831,526 B2 * | 9/2014 | Hasegawa ............. H04L 1/0015 455/67.11 |
| 10,742,475 B2 * | 8/2020 | Lai ........................... H04B 1/38 |
| 2010/0117890 A1 * | 5/2010 | Vook ..................... H04B 17/21 342/174 |

(Continued)

FOREIGN PATENT DOCUMENTS

| CN | 108809600 | 11/2018 |
| EP | 3 573 276 | 11/2019 |

(Continued)

OTHER PUBLICATIONS

International Search Report dated May 6, 2020 issued in counterpart application No. PCT/KR2020/000392, 8 pages.

(Continued)

*Primary Examiner* — David Q Nguyen
(74) *Attorney, Agent, or Firm* — The Farrell Law Firm, P.C.

(57) ABSTRACT

The present disclosure relates to a pre-5th-Generation (5G) or 5G communication system to be provided for supporting higher data rates Beyond 4th-Generation (4G) communication system such as Long Term Evolution (LTE). An apparatus and method are provided for analyzing propagation characteristics in a wireless communication system. The method includes analyzing a first propagation characteristic relating to a first antenna element; and determining a second propagation characteristic relating to a second antenna element, based on the first propagation characteristic.

12 Claims, 16 Drawing Sheets

(56) References Cited

U.S. PATENT DOCUMENTS

| | | | |
|---|---|---|---|
| 2010/0141528 A1* | 6/2010 | Harel | H01Q 3/26 |
| | | | 342/368 |
| 2012/0027068 A1 | 2/2012 | Motoyoshi | |
| 2014/0257779 A1 | 9/2014 | Yoon et al. | |
| 2017/0205502 A1 | 7/2017 | Honma et al. | |
| 2017/0223733 A1* | 8/2017 | Nakata | H04L 25/0224 |
| 2018/0206128 A1 | 7/2018 | Perez et al. | |
| 2020/0182995 A1* | 6/2020 | Zeng | G01S 13/723 |
| 2020/0271747 A1* | 8/2020 | Wu | G01P 15/18 |
| 2020/0271749 A1* | 8/2020 | Wu | G01C 21/188 |
| 2021/0247483 A1* | 8/2021 | Wang | G01S 13/343 |
| 2021/0311162 A1* | 10/2021 | Mai | G01S 13/003 |

FOREIGN PATENT DOCUMENTS

| | | |
|---|---|---|
| KR | 100948186 | 3/2010 |
| WO | WO 2007/035052 | 3/2007 |
| WO | WO 2017/009272 | 1/2017 |
| WO | WO 2019/002225 | 1/2019 |

OTHER PUBLICATIONS

European Search Report dated Nov. 10, 2021 issued in counterpart application No. 20738657.4-1231, 9 pages.
Korean Office Action dated Dec. 1, 2021 issued in counterpart application No. 10-2019-0002697, 14 pages.

* cited by examiner

DEVICE AND METHOD FOR ANALYZING PROPAGATION CHARACTERISTICS IN WIRELESS COMMUNICATION SYSTEM

CROSS-REFERENCE TO RELATED APPLICATION(S)

This application is based on and claims priority under 35 U.S.C. § 119 to Korean Patent Application No. 10-2019-0002697, filed on Jan. 9, 2019, in the Korean Intellectual Property Office, the entire disclosure of which is incorporated herein by reference.

BACKGROUND

1. Field

The disclosure relates generally to a wireless communication system and, more particularly, to a device and a method for analyzing propagation characteristics in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMPs), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Because a 5G system is expected to use a frequency band that is somewhat higher than a conventional cellular system (e.g., an LTE system), the 5G system may have a smaller cell coverage and greater signal attenuation than the conventional cellular system. Therefore, if an accurate prediction for service availability according to a user's location can be achieved, better service may be provided.

SUMMARY

The disclosure is made to address at least the problems and/or disadvantages described above and to provide at least the advantages described below.

Accordingly, an aspect of the disclosure is to provide a device and a method for effectively analyzing propagation characteristics of a signal in a wireless communication system.

Another aspect of the disclosure is to provide a device and a method for analyzing propagation characteristics of a signal by using ray tracing in a wireless communication system.

Another aspect of the disclosure is to provide a device and a method for reducing computational complexity required for an analysis of propagation characteristics of a signal in a wireless communication system.

Another aspect of the disclosure is to provide a device and a method for grouping antenna elements which emit signals having similar propagation characteristics in a wireless communication system.

Another aspect of the disclosure is to provide a device and a method for determining propagation characteristics relating to another antenna element, based on propagation characteristics relating to one antenna element in a wireless communication system.

In accordance with an aspect of the disclosure, a method is provided for analyzing propagation characteristics. The method includes performing an analysis of a first propagation characteristic relating to a first antenna element; and determining a second propagation characteristic relating to a second antenna element, based on the first propagation characteristic.

In accordance with another aspect of the disclosure, a device is provided for analyzing propagation characteristics. The device includes a storage unit and a processor. The processor may perform an analysis of a first propagation characteristic relating to a first antenna element and determine a second propagation characteristic relating to a second antenna element, based on the first propagation characteristic.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described based on an approach of hardware. However, various embodiments of the disclosure include technologies that uses both hardware and software and thus, the various embodiments of the disclosure may not exclude the perspective of software.

The disclosure generally relates to a device and a method for analyzing propagation characteristics in a wireless communication system. Accordingly, the disclosure provides description of a technology for analyzing and providing propagation characteristics of a radiated signal for each antenna element in a wireless communication system.

Terms referring to signals, terms referring to algorithms, terms referring to phenomena applied to signals, terms referring to entities, terms referring to components of a device, etc., which are used in the following description, are exemplified for convenience of description. Accordingly, the disclosure is not limited to the following terms and other terms having the same technical meaning may be used.

For example, the terms used in the disclosure are only used to describe specific embodiments, and are not intended to limit the disclosure.

The term "~unit" or "~er" used hereinafter may refer to the unit for processing at least one function or operation and may be implemented in hardware, software, or a combination of hardware and software.

A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have meanings equal to the contextual meanings in the relevant field of art, and are not to be interpreted to have ideal or excessively formal meanings unless clearly defined in the disclosure. In some cases, even the terms defined in the disclosure should not be interpreted to exclude embodiments of the disclosure.

In addition, the disclosure provides description of various embodiments by using terms used in some communication standards (e.g., 3rd generation partnership project (3GPP)). However, such a description is only an example. Various embodiments of the disclosure may be easily modified and applied in other communication systems.

Figure 1:
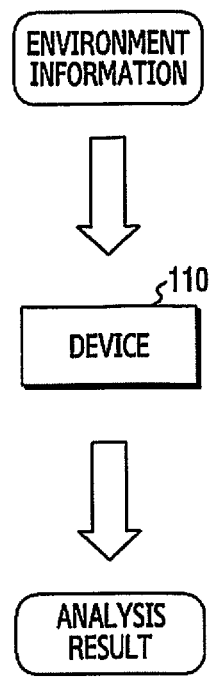
FIG. 1 illustrates a system according to an embodiment.

FIG. 1 illustrates a system according to an embodiment.

Referring to FIG. 1, the system includes a device 110 as an entity for analyzing propagation characteristics. The device 110 may be configured by including a program installed therein to perform a function for analyzing propagation characteristics in a general-purpose computing device, or may be a device exclusively designed to perform a corresponding function. For example, the device 110 may be implemented as a cloud system as well as a single computing device.

The device 110 analyzes propagation characteristics of signals in a wireless communication system. The device 110 may obtain estimation data, such as a movement path of a signal and a degree of attenuation of the signal. In addition, the device 110 may perform an operation, such as estimating signal quality for each region, identifying a propagation shadow region, or determining service availability at a specific location, based on the estimation data, so that secondary evaluation information such as signal quality for each region, location of a propagation shadow region, and service availability for each location may be generated. The device 110 may further generate recommendation information such as the number of antennas required for a service, a required transmission parameter (e.g., power, angle, etc.), and an installation location of the antennas, based on the evaluation information. However, according to another embodiment, the secondary evaluation information and the recommendation information may be generated by an object other than the device 110.

In order for the device 110 to analyze propagation characteristics, environment information may be provided to the device 110. The environment information may be input to the device 110 offline or received from another device through a wired or wireless network. A server may manage the environment information. The environment information includes information on a region where a simulation of propagation characteristics is to be performed, and may include information on a terrain, a building, a road, a facility, a tree, etc.

When the propagation characteristics are analyzed based on the environment information, the device 110 may output a propagation analysis result. The output propagation analysis result may indicate at least one of measurement data, secondary evaluation information, and recommendation information. The output may be performed in many forms. For example, the propagation analysis result may be provided to a user through a visual or audio means (e.g., a monitor, a printer, a speaker, etc.) that can be recognized by a person. As another example, data including the propagation analysis result may be transmitted to another device through a wired or wireless network.

Figure 2:
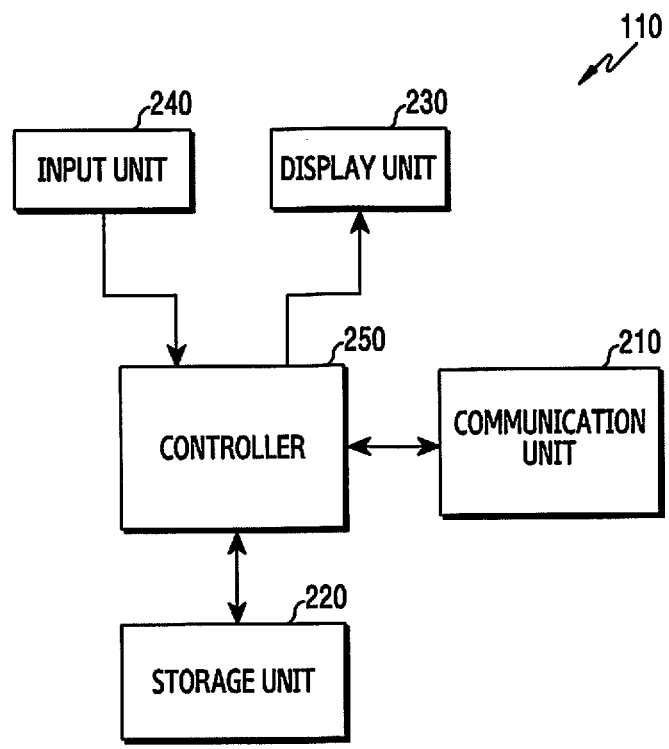
FIG. 2 illustrates a device for analyzing propagation characteristics according to an embodiment.

FIG. 2 illustrates a device for analyzing propagation characteristics according to an embodiment. The configuration illustrated in FIG. 2 may be understood as the configuration of the device 110. The term "~unit" or "~er" used hereinafter may refer to the unit for processing at least one function or operation and may be implemented in hardware, software, or a combination of hardware and software.

Referring to FIG. 2, the device includes a communication unit 210, a storage unit 220, a display unit 230, an input unit 240, and a controller 250.

The communication unit 210 performs functions for transmitting and receiving a signal through a wired or wireless channel. That is, the communication unit 210 provides an interface for communicating with other objects (e.g., a server) in a network. For example, the communication unit 210 converts a bit stream transmitted from the server to another object into a physical signal, and converts a physical signal received from another node into a bit stream. That is, the communication unit 210 may transmit and receive a signal. Accordingly, the communication unit 210 may be referred to as a modem, a transmitter, a receiver, or a transceiver.

The storage unit 220 may store data, such as a basic program for operating the device, an application program, configuration information, etc. The storage unit 220 may provide the stored data at the request of the controller 250 and store the data at the request of the controller 250.

The display unit 230 outputs data and information to be recognizable by a user. The display unit 230 may generate and display a visually recognizable screen. Alternatively, the display unit 230 may be replaced with another device or devices capable of performing an output in a form which can be recognized in a different sense in addition to a form which is visually recognizable. The display unit 230 may include at least one hardware module for output. The hardware module may include at least one of a speaker, a liquid crystal display (LCD), a light emitting diode (LED), a light emitting polymer display (LPD), an organic light emitting diode (OLED), an active matrix organic light emitting diode (AMOLED), and a flexible LED (FLED).

The input unit 240 performs functions for detecting a user's input. The input unit 240 may transfer a command or data input from a user to the controller 250. The input unit 240 may include at least one hardware module for input. The hardware module may include at least one of a sensor, a keyboard, a touch pad, a button, and an input/output port. Alternatively, the display unit 230 and the input unit 240 may be implemented as one component, e.g., as a touch screen.

The controller 250 controls overall operations of the device. The controller 250 may transmit and receive a signal through the communication unit 210. The controller 250 may record data in the storage unit 220 and read the recorded data. The controller 250 may include at least one processor or at least one micro-processor, or may be a part of the processor.

The device for analyzing propagation characteristics as illustrated in FIG. 2 may analyze propagation characteristics in a given communication environment. For example, the device may predict propagation characteristics through a simulation in a 3D modeled virtual space.

Figure 3:
FIG. 3 illustrates an environment in which an analysis of propagation characteristics is performed according to an embodiment.

FIG. 3 illustrates an environment in which an analysis of propagation characteristics is performed according to an embodiment.

Referring to FIG. 3, a plurality of obstacles, such as buildings and trees, are identified on the ground. Each obstacle has a location and a shape, and the shape of the obstacle may be formed of surfaces having a predetermined size. In a given environment, a base station and a terminal, that is, a transmitting device and a receiving device, may be arranged, and a device may analyze and estimate a change experienced by a signal radiated from a base station while the signal is received by terminals.

The base station has at least one antenna array, and the antenna array is designed to include a plurality of antenna elements. Accordingly, the device performs operations for obtaining propagation characteristics of a signal radiated from each of the antenna elements. The signal radiated from each of the antenna elements may be treated as a plurality of rays, and thus, a ray tracing technique may be used to analyze propagation characteristics.

When the ray tracing technique is applied, the signal radiated from the antenna element may be modeled into a plurality of rays, based on a radiation pattern. For example, each of the rays has a configuration value corresponding to the magnitude of the signal and proceeds through a virtual space. The ray may collide with an obstacle, and thus, may be reflected by, may penetrate through, or may be diffracted by the obstacle. The device analyzes propagation characteristics by identifying interaction (e.g. reflection, penetration, or diffraction) with an obstacle according to the proceeding of the ray, and calculating a change in the signal (e.g., a change in a direction, attenuation, and a change in other characteristics) due to the interaction.

When a communication technology using a plurality of antenna elements, such as MIMO, is used, very high computational complexity may be required if a conventional ray tracing technique is applied. Accordingly, an alternative is required to lower the amount of computation while maintaining the accuracy of an analysis.

Figure 4:
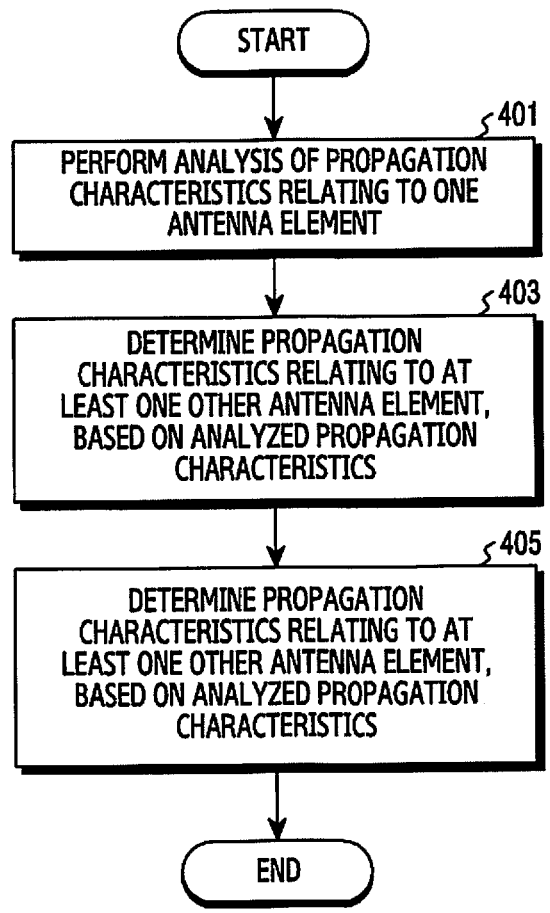
FIG. 4 is a flowchart illustrating a method for analyzing propagation characteristics according to an embodiment.

FIG. 4 is a flowchart illustrating a method for analyzing propagation characteristics according to an embodiment.

Referring to FIG. 4, in step 401, the device analyzes propagation characteristics relating to one antenna element. The device may select one of a plurality of antenna elements included in an antenna array as a reference antenna element and analyze propagation characteristics relating to the reference antenna element. The device may model a signal radiated from the reference antenna element into a plurality of rays and identify at least one obstacle interacting with the rays before the rays reach an antenna of a receiving device, and an attribute change in the rays. That is, the propagation characteristics may include at least one of a movement path of a ray or signal, an obstacle which interacts with the ray or signal, and a change in an attribute value of the signal.

In step 403, the device determines propagation characteristics relating to at least one other antenna element, based on the analyzed propagation characteristics. That is, the device may determine propagation characteristics relating to another antenna element by modifying the propagation characteristics relating to the reference antenna element. The device may modify the propagation characteristics relating to the reference antenna element in consideration of a distance between the reference antenna element and another antenna element. The device may compensate for at least one of a movement path, a contact point with an obstacle, and an attenuation amount caused by the obstacle, which are included in the propagation characteristic relating to the reference antenna element.

In step 405, the device outputs propagation characteristic information relating to the plurality of antenna elements. For example, the propagation characteristic information indicates propagation characteristics relating to each antenna element. The information, which is output, may be measurement data indicating the propagation characteristics themselves or evaluative or advisory information derived from the measurement data. The device may display the propagation characteristic information through an output device such as a monitor, or transmit data including the propagation characteristic information through a network.

Figure 5:
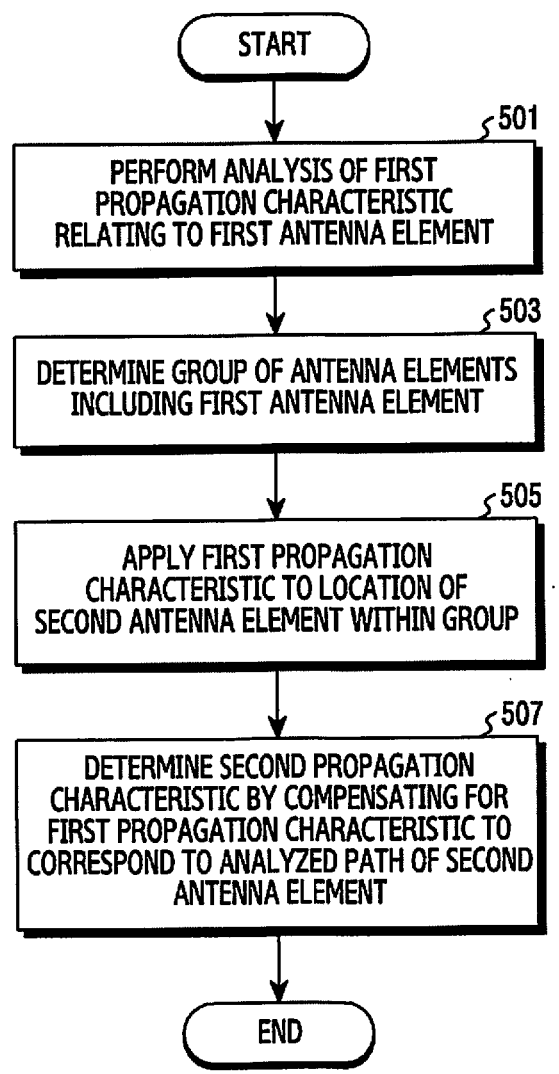
FIG. 5 is a flowchart illustrating a method for compensating for propagation characteristics according to an embodiment.

FIG. 5 is a flowchart illustrating a method for compensating for propagation characteristics according to an embodiment.

Referring to FIG. 5, in step 501, the device analyzes a first propagation characteristic relating to a first antenna element. For example, the first antenna element is a reference antenna element, and the device estimates the first propagation characteristic by performing ray tracing on the first antenna element.

In step 503, the device determines a group of antenna elements including the first antenna element. An operation of determining propagation characteristics based on propagation characteristics relating to another antenna element may be performed when the similarity of propagation characteristics is expected. Therefore, the device includes at least one antenna element expected to have similar propagation characteristics in the group of the first antenna element. For example, in relation to a movement path of a signal, when a signal radiated from a corresponding antenna element and a signal radiated from the first antenna element are expected to come into contact with the same obstacles, the device may include the corresponding antenna element in the group of the first antenna element. The contact with the same obstacles may include reflection or penetration on the same surface of the same obstacle, or diffraction at the same corner of the same obstacle.

In step 505, the device applies the first propagation characteristic to a location of a second antenna element in the group. For example, the device applies a movement path of a signal included in the first propagation characteristic to the location of the second antenna element. The device may shift the movement path such that a starting point of a movement path of the signal radiated from the first antenna element is the second antenna element.

In step 507, the device determines a second propagation characteristic by compensating for the first propagation characteristic to correspond to a signal path of the second antenna element. The movement path of the signal radiated from the first antenna element may be applied to the location of the second antenna element, so that the signal may be reflected or refracted at a location having no obstacle, or an arrival point of the signal may escape from a location of an antenna of a receiving device. Accordingly, the device may modify the movement path such that the reflection or refraction of the signal is made at the surface of an obstacle and the signal reaches the antenna of the receiving device, and then compensate for a parameter indicating an effect caused by interaction with the obstacle. The parameter may be compensated based on an angle which a surface or a corner of the obstacle makes with respect to a movement direction of the signal, etc.

Figure 6:
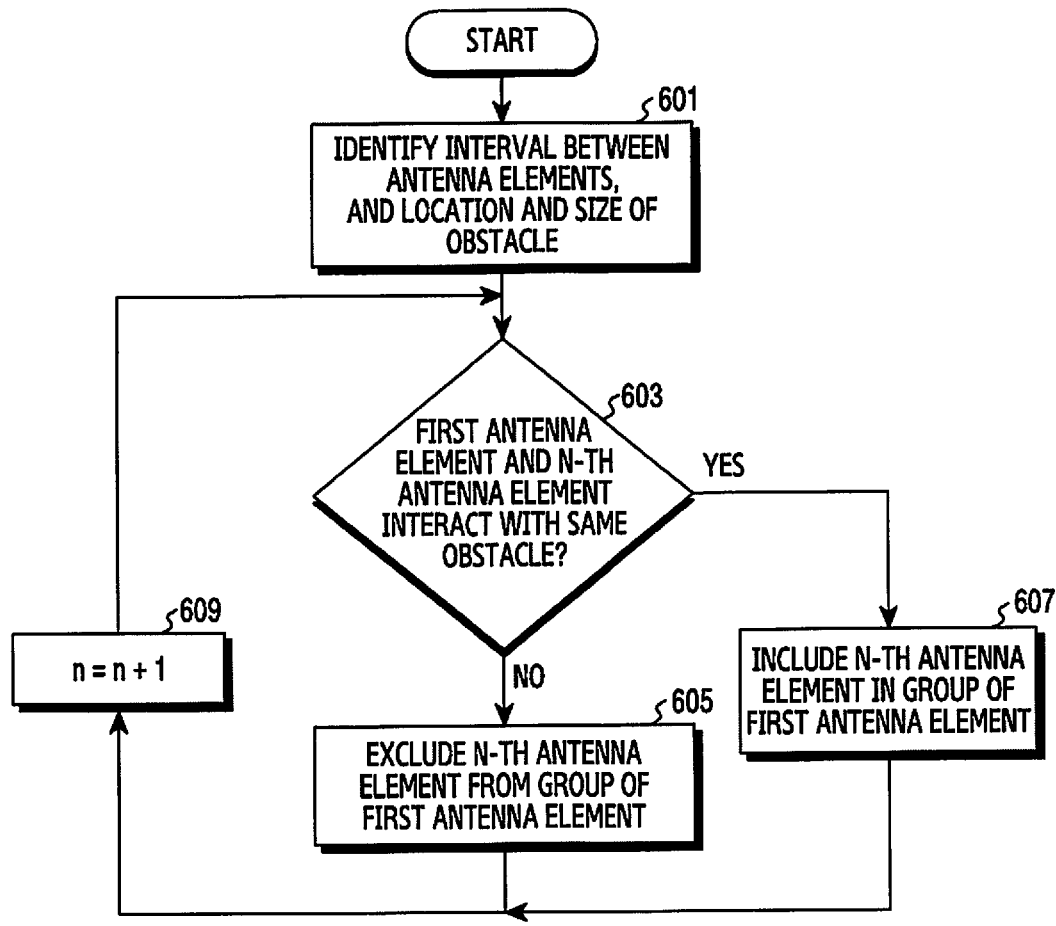
FIG. 6 is a flowchart illustrating a method for grouping antenna elements according to an embodiment.

FIG. 6 is a flowchart illustrating a method for grouping antenna elements according to an embodiment. More specifically, FIG. 6 may be understood as illustrating a procedure for obtaining propagation characteristics relating to a first antenna element selected as a reference antenna element, and then adding another antenna element to a group of the first antenna element.

Referring to FIG. 6, in step 601, the device identifies an interval between the antenna elements, and a location and a size of an obstacle. The device may identify an interval between the first antenna element and another antenna element, a location and a size of a surface of an obstacle in contact with a signal radiated from the first antenna element, a position of a corner of the obstacle, a movement distance of the signal, etc. The surface of the obstacle may be formed of a polygon.

In step 603, the device determines whether the first antenna element and an n-th antenna element interact with the same obstacle. The n is initialized to 2 at the beginning of the procedure. That is, the device determines whether the first antenna element and another antenna element interact with the same obstacle, i.e., whether a signal radiated from another antenna element interacts with obstacles with which the signal radiated from the first antenna element interacts. In this case, if the signals interact with the same obstacles, this may indicate that the contact surfaces or corners of the obstacles are the same.

When it is determined that the first antenna element and the n-th antenna element do not interact with the same obstacle in step 603, the device excludes the n-th antenna element from the group of the first antenna element in step 605. When obstacles with which the signal radiated from the first antenna element interacts and obstacles with which a signal radiated from the n-th antenna element interacts include at least one different obstacle, the device determines that the first antenna element and the n-th antenna element cannot belong to the same group.

However, when it is determined that the first antenna element and the n-th antenna element interact with the same obstacle in step 603, the device includes the n-th antenna element in the group of the first antenna element in step 607. When the obstacles with which the signal radiated from the first antenna element interacts and the obstacles with which the signal radiated from the n-th antenna element interacts are the same, the device determines that the first antenna element and the n-th antenna element can belong to the same group.

Accordingly, the antenna elements may be grouped with reference to the interacting obstacles.

Figure 7:
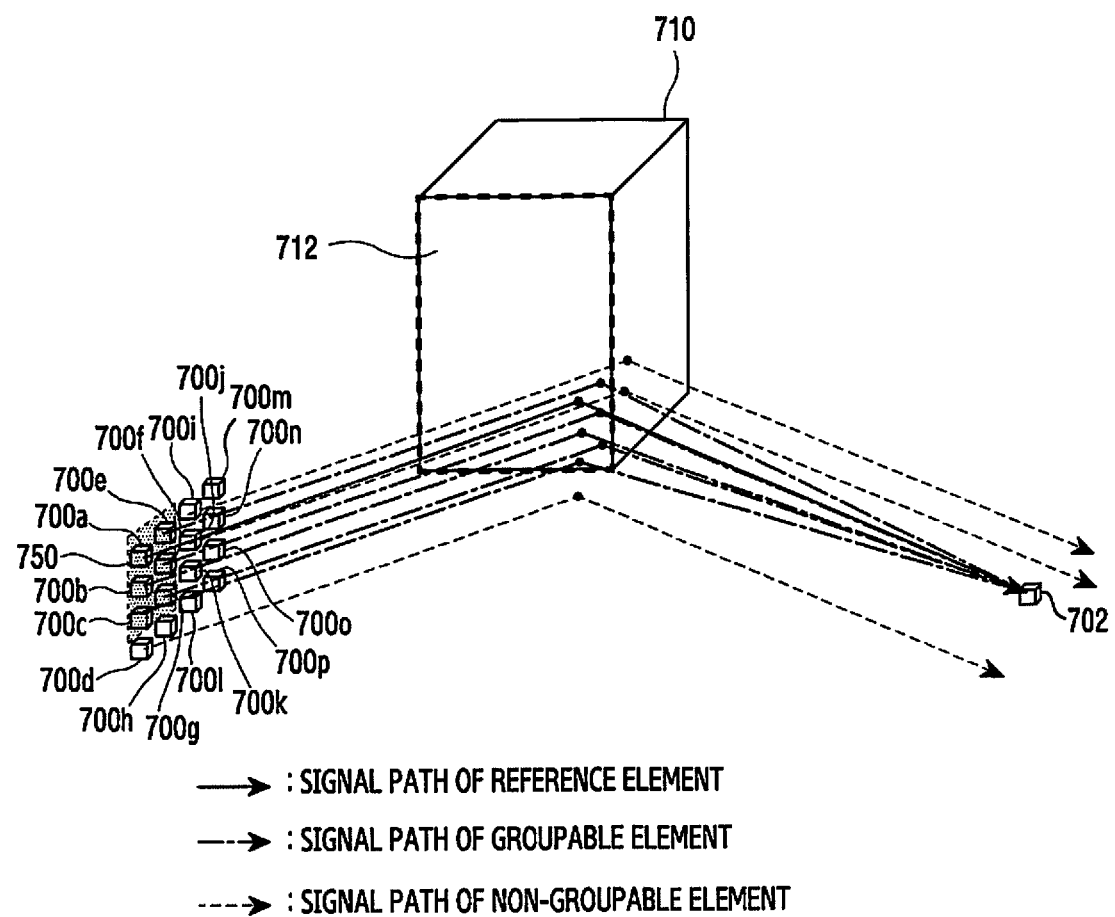
FIG. 7 illustrates a grouping result of antenna elements according to an embodiment.

FIG. 7 illustrates a grouping result of antenna elements according to an embodiment.

Referring to FIG. 7, a transmitting device includes 16 antenna elements 700a to 700p and a receiving device includes one antenna element 702. A first antenna element 700a is selected as a reference antenna, and a signal radiated from the first antenna element 700a is reflected at one surface 712 of a building 710 and then reaches the antenna element 702.

When a movement path of the signal radiated from the first antenna element 700a is applied to each of the other antenna elements 700b to 700p, signals radiated from some antenna elements 700b, 700c, 700e, 700f, and 700g are reflected at the surface 712, and then reach the antenna element 702. However, signals radiated from the remaining antenna elements 700d, 700h, 700i, 700j, 700k, 700l, 700m, 700n, 700o, and 700p do not come into contact with the surface 712. Therefore, the antenna elements 700a, 700b, 700c, 700e, 700f, and 700g, which can emit signals reflected at the same surface 712 and then reaching the antenna element 702, are grouped into a group 750.

As described above, two or more antenna elements may be grouped. In the example of FIG. 7, only one signal path from the reference antenna element 700a to the antenna element 702 has been considered. However, a plurality of signal paths may exist from the reference antenna element 700a to the antenna element 702. In this case, upon selection of another antenna element which may be included in the group, an antenna element having signal paths interacting with the same obstacle with respect to all of the plurality of signal paths may be selected, or an antenna element having signal paths interacting with the same obstacle with respect to a part of the plurality of signal paths may be selected.

According to an embodiment, propagation characteristics of antenna elements belonging to the same group may be derived from propagation characteristics relating to one antenna element in the group. In order to determine propagation characteristics relating to other antenna elements from the propagation characteristics relating to the one antenna element, compensation of the propagation characteristics in consideration of a location difference between the antenna elements may be utilized. The compensation may be made in consideration of at least one of a reflection of a signal, a penetration of the signal, and a diffraction of the signal.

Figure 8A:
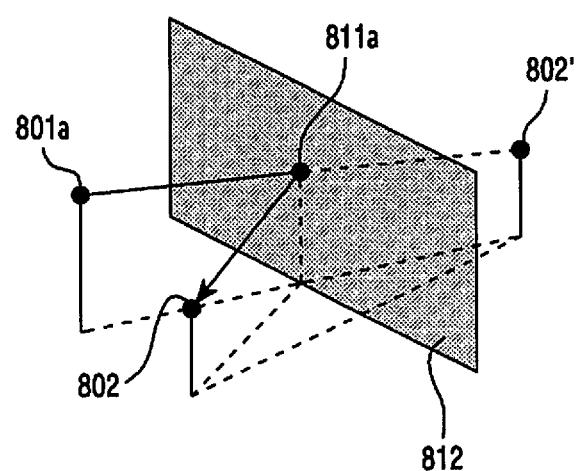
FIG. 8A illustrates compensation of propagation characteristics in consideration of signal reflection according to an embodiment.

FIG. 8A illustrates compensation of propagation characteristics in consideration of signal reflection according to an embodiment. More specifically, FIG. 8A illustrates a signal path of a reference antenna element.

Referring to FIG. 8A, a signal radiated from a first transmission point 801a of the reference antenna element is reflected at a collision point 811a of a surface 812 and then reaches a reception point 802. A point 802' is a point symmetric with respect to the reception point 802 with reference to the surface 812.

Figure 8B:
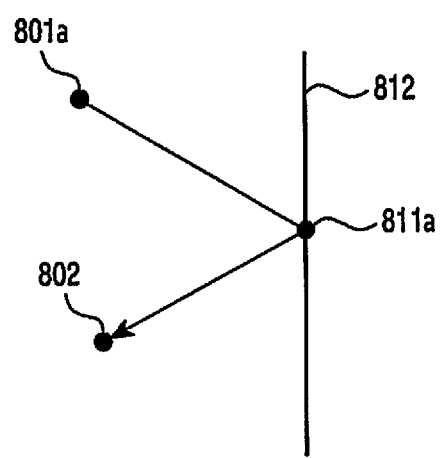
FIG. 8B illustrates compensation of propagation characteristics in consideration of signal reflection according to an embodiment.

FIG. 8B illustrates compensation of propagation characteristics in consideration of signal reflection according to an embodiment. More specifically, FIG. 8B is a top view of FIG. 8A.

Referring to FIG. 8B, the signal radiated from the transmission point 801a is reflected to have at a predetermined incident angle and reflection angle with the surface 812, and then reaches the reception point 802.

Figure 8C:
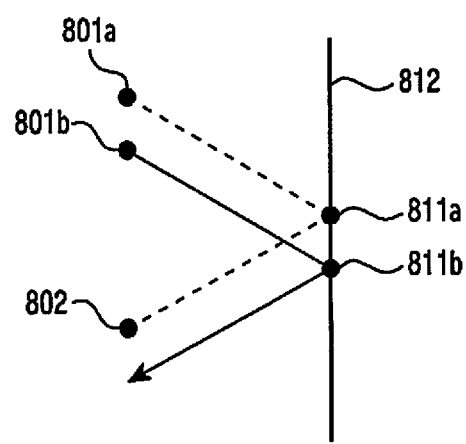
FIG. 8C illustrates compensation of propagation characteristics in consideration of signal reflection according to an embodiment.

FIG. 8C illustrates compensation of propagation characteristics in consideration of signal reflection according to an embodiment.

Referring to FIG. 8C, a signal path is shifted to a second transmission point 801b of another antenna element. Accordingly, an arrival point of the signal path escapes from the reception point 802 and is generated at a new collision point 811b with the surface 812.

Figure 8D:
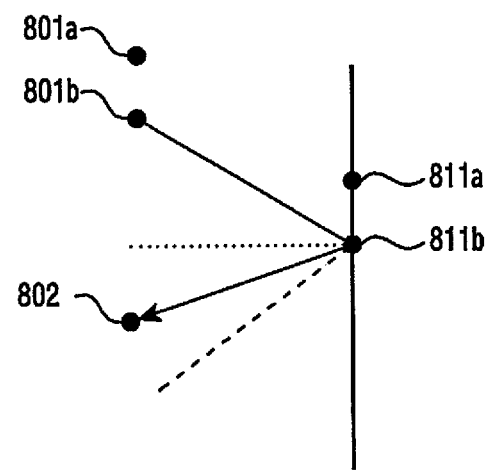
FIG. 8D illustrates compensation of propagation characteristics in consideration of signal reflection according to an embodiment.

FIG. 8D illustrates compensation of propagation characteristics in consideration of signal reflection according to an embodiment.

Referring to FIG. 8D, the path is modified such that a signal radiated from the second transmission point 801b reaches the reception point 802 while the collision point 811b is maintained. As a result, an incident angle and a reflection angle of the signal are different from each other.

Figure 8E:
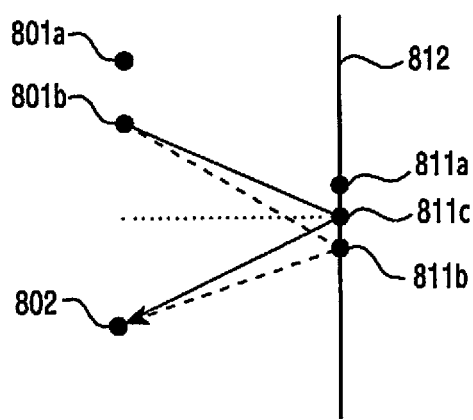
FIG. 8E illustrates compensation of propagation characteristics in consideration of signal reflection according to an embodiment.

FIG. 8E illustrates compensation of propagation characteristics in consideration of signal reflection according to an embodiment.

Referring to FIG. 8E, a new collision point 811c is determined such that the incident angle and the reflection angle are the same. The signal path passing through the new collision point 811c is determined as a signal path of the another antenna element. Accordingly, the incident angle and the reflection angle of the signal with respect to the surface 812 are changed, and thus the amount of signal attenuation caused by reflection is also compensated based on the incident angle or the reflection angle.

Figure 9A:
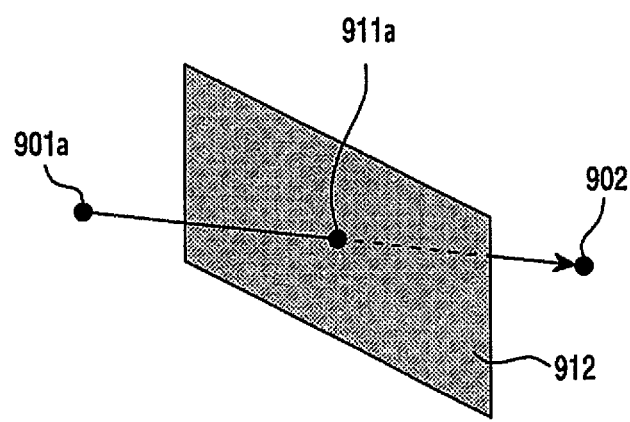
FIG. 9A illustrates compensation of propagation characteristics in consideration of signal penetration according to an embodiment.

FIG. 9A illustrates compensation of propagation characteristics in consideration of signal penetration according to an embodiment of the disclosure. More specifically, FIG. 9A illustrates a signal path of a reference antenna element.

Referring to FIG. 9A, a signal radiated from a first transmission point 901a of the reference antenna element passes through a surface 912 at a penetration point 911a and reaches a reception point 902.

Figure 9B:
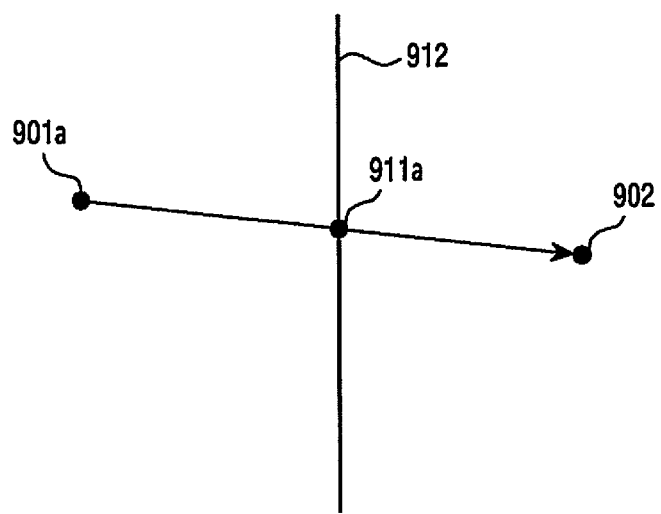
FIG. 9B illustrates compensation of propagation characteristics in consideration of signal penetration according to an embodiment.

FIG. 9B illustrates compensation of propagation characteristics in consideration of signal penetration according to an embodiment. More specifically, FIG. 9B is a top view of FIG. 9A.

Figure 9C:
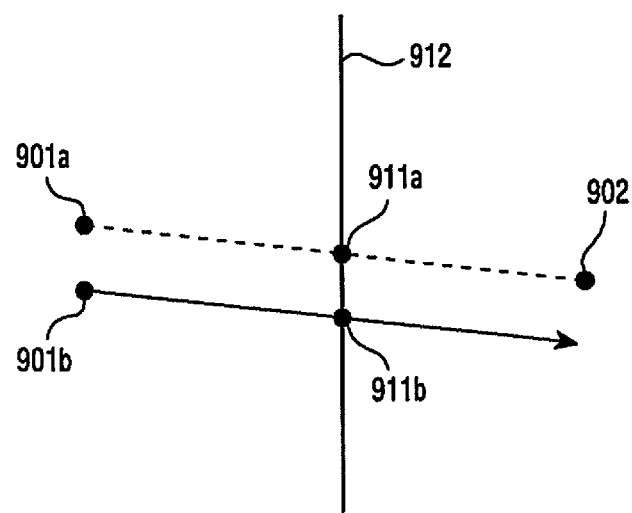
FIG. 9C illustrates compensation of propagation characteristics in consideration of signal penetration according to an embodiment.

FIG. 9C illustrates compensation of propagation characteristics in consideration of signal penetration according to an embodiment.

Referring to FIG. 9C, a signal path is shifted to a second transmission point 901b of another antenna element. Accordingly, an arrival point of the signal path escapes from the reception point 902 and is generated at a new penetration point 911b with the surface 912.

Figure 9D:
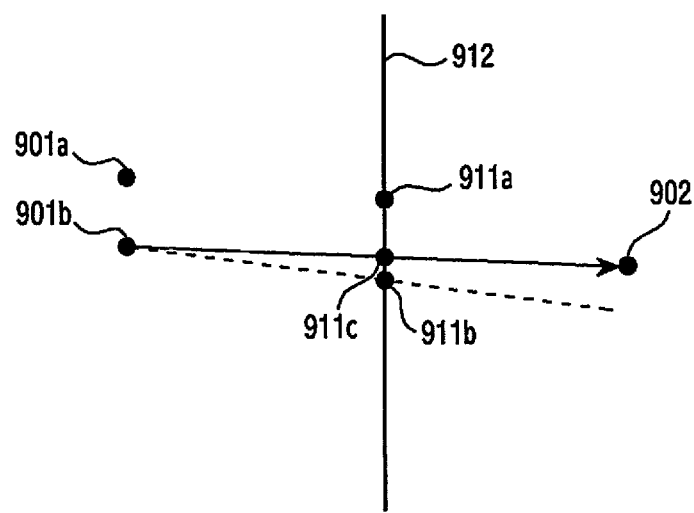
FIG. 9D illustrates compensation of propagation characteristics in consideration of signal penetration according to an embodiment.

FIG. 9D illustrates compensation of propagation characteristics in consideration of signal penetration according to an embodiment.

Referring to FIG. 9D, the path is modified such that a signal radiated from the second transmission point 901b reaches the reception point 902. As a result, a new penetration point 911c is determined. The signal path passing through the new penetration point 911c is determined as a signal path of the another antenna element. Accordingly, an incident angle and a refraction angle of the signal with respect to the surface 912 are changed, and thus the amount of signal attenuation caused by the penetration may also be compensated based on the incident angle or the refraction angle.

As described above, a path corresponding to another antenna element is determined based on a path corresponding to one antenna element, and propagation characteristics may be compensated in consideration of signal reflection and signal penetration. For example, propagation characteristics relating to one antenna element are compensated, so that propagation characteristics relating to another antenna element may be determined.

Although the examples described above relate to compensation related to signal reflection or signal penetration, compensation related to signal diffraction may also be performed. The compensation related to the signal diffraction may include at least one of correction of a location where a signal is diffracted, correction of a diffraction angle, and correction of the amount of signal attenuation.

Based on the propagation characteristics relating to another antenna element determined through the above-described compensation process, an obstacle with which a signal interacts may be changed. The propagation characteristics relating to another antenna element may not include interaction with at least one obstacle included in propagation characteristics relating to the reference antenna element. For example, the propagation characteristics may be compensated such that a signal radiated from the reference antenna element has a signal path in which the signal is not reflected at one surface of a building where the signal is reflected, or the signal radiated from the reference antenna element has a signal path in which the signal does not pass through a surface through the signal passes. In this case, the corresponding antenna element may be determined later as being unable to be grouped with the reference antenna element, and the corresponding antenna element may be excluded from the group. Accordingly, the device may determine the propagation characteristics relating to the corresponding antenna element again. The device may analyze the propagation characteristics relating to the corresponding antenna element by including the corresponding antenna element in another group or performing additional ray tracing.

According to an embodiment of the disclosure, a signal radiated from a first transmission point of the reference antenna element may be diffracted at a corner and then reach a reception point.

According to an embodiment of the disclosure, a signal path is shifted to a second transmission point of another antenna element. Accordingly, an arrival point of the signal path escapes from the reception point and a signal radiated from the second transmission point is diffracted at a position other than the corner According to an embodiment of the disclosure, the path is modified such that the signal is diffracted at the corner and reaches the reception point. Accordingly, an incident angle of the signal with respect to the corner is changed, and thus the amount of signal attenuation caused by diffraction is also compensated based on the incident angle.

According to an embodiment, information on propagation characteristics for each antenna element may be obtained. More specifically, a more accurate analysis of propagation characteristics can be performed by detecting and analyzing a real path for each antenna element rather than synthesis of antenna patterns. Further, antenna elements may be grouped and another analysis result may be derived from one analysis result, so that high-speed propagation environment analysis is possible in a multi-antenna system.

The information on propagation characteristics may be used for network design. The information on propagation characteristics may be provided as its own measurement data or used to determine evaluation information or recommendation information determined from the measurement data. An analysis result including at least one of the measurement data, evaluation information, and recommendation information may be output by an output means provided in the device. For example, the analysis result may be displayed in a text form or in a graphical manner.

According to an embodiment, the device may display a map, display a transmission point and a reception point on a map, and display signal quality for each reception point by using graphic items (e.g., color, indicator, etc.). Alternately, the device may display a point on the map where an installation of a base station is recommended, by using graphic items (e.g., color, indicator, text, etc.). In addition, the device may display various pieces of information on the analysis result.

Various methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described embodiments, while a component may be expressed in the singular or the plural according to a presented embodiment, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for analyzing propagation characteristics, the method comprising:
    analyzing a first propagation characteristic relating to a reference antenna element;
    identifying a group including the reference antenna element, wherein one or more second antenna elements included in the group is determined based on a similarity of a propagation characteristic corresponding to each of the one or more second antenna elements;
    applying the first propagation characteristic to the one or more second antenna elements;
    compensating the first propagation characteristic based on signal reflection caused by at least one obstacle, signal penetration with respect to the at least one obstacle, and signal diffraction caused by the at least one obstacle, wherein the first propagation characteristic comprises a movement path of a signal included in the first propagation characteristic, a contact point of the signal with the at least one obstacle, and an attenuation amount of the signal, which is caused by the at least one obstacle; and
    determining a second propagation characteristic based on the compensation of the first propagation characteristic to correspond to the one or more second antenna elements.

2. The method of claim 1, further comprising grouping the one or more second antenna elements into the group with the reference antenna element based on an interval between the reference antenna element and each of the one or more second antenna elements.

3. The method of claim 1, wherein analyzing the first propagation characteristic relating to the reference antenna element comprises:
    modeling the signal radiated from the reference antenna element into a plurality of rays;
    identifying the at least one obstacle interacting with the rays before the rays reach an antenna of a receiving device; and
    identifying an attribute change in the rays caused by the interaction.

4. The method of claim 1, further comprising re-determining propagation characteristics relating to the one or more second antenna elements when the second propagation characteristic does not include interaction with the at least one obstacle included in the first propagation characteristic.

5. The method of claim 1, further comprising displaying an analysis result including the first propagation characteristic and the second propagation characteristic.

6. The method of claim 5, wherein the analysis result comprises at least one of a movement path of a signal, a degree of attenuation of the signal, a signal quality for each region, service availability for each region, a propagation shadow region, an installation location of an antenna, and a recommended transmission parameter.

7. A device for analyzing propagation characteristics, the device comprising:
a storage unit; and
a processor configured to:
analyze a first propagation characteristic relating to a reference antenna element,
identify a group including the reference antenna element, wherein one or more second antenna elements included in the group is determined based on a similarity of a propagation characteristic corresponding to each of the one or more second antenna elements;
apply the first propagation characteristic to the one or more second antenna elements;
compensate the first propagation characteristic based on signal reflection caused by at least one obstacle, signal penetration with respect to the at least one obstacle, and signal diffraction caused by the at least one obstacle, wherein the first propagation characteristic comprises a movement path of a signal included in the first propagation characteristic, a contact point of the signal with the at least one obstacle, and an attenuation amount of the signal, which is caused by the at least one obstacle; and
determine a second propagation characteristic based on the compensation of the first propagation characteristic to correspond to the one or more second antenna elements.

8. The device of claim 7, wherein the processor is further configured to group the one or more second antenna elements into the group with the reference antenna element based on an interval between the reference antenna element and each of the one or more second antenna elements.

9. The device of claim 7, wherein the processor is further configured to:
model the signal radiated from the reference antenna element into a plurality of rays,
identify the at least one obstacle interacting with the rays before the rays reach an antenna of a receiving device, and
identify an attribute change in the rays caused by the interaction.

10. The device of claim 7, wherein the processor is further configured to re-determine propagation characteristics relating to the one or more second antenna elements when the second propagation characteristic does not include interaction with the at least one obstacle included in the first propagation characteristic.

11. The device of claim 7, further comprising a display unit configured to display an analysis result including the first propagation characteristic and the second propagation characteristic.

12. The device of claim 11, wherein the analysis result comprises at least one of a movement path of a signal, a degree of attenuation of the signal, a signal quality for each region, service availability for each region, a propagation shadow region, an installation location of an antenna, and a recommended transmission parameter.

* * * * *